United States Patent
Aoyama et al.

(10) Patent No.: US 7,615,297 B2
(45) Date of Patent: Nov. 10, 2009

(54) FUEL CELL

(75) Inventors: Satoshi Aoyama, Susono (JP); Naoki Ito, Yokohama (JP); Masahiko Iijima, Iruma-gun (JP); Shigeru Ogino, Toyota (JP); Kenji Kimura, Toyota (JP); Hiromichi Sato, Atsugi (JP); Yasuhiro Izawa, Mishima (JP); Satoshi Iguchi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 578 days.

(21) Appl. No.: 10/582,684

(22) PCT Filed: Dec. 16, 2004

(86) PCT No.: PCT/JP2004/019292

§ 371 (c)(1),
(2), (4) Date: Jun. 13, 2006

(87) PCT Pub. No.: WO2005/062412

PCT Pub. Date: Jul. 7, 2005

(65) Prior Publication Data

US 2007/0160884 A1    Jul. 12, 2007

(30) Foreign Application Priority Data

Dec. 24, 2003    (JP) .................. 2003-427035

(51) Int. Cl.
*H01M 8/04*    (2006.01)
*H01M 8/12*    (2006.01)
*H01M 4/94*    (2006.01)

(52) U.S. Cl. .................. 429/26; 429/30; 429/41; 429/44

(58) Field of Classification Search .......... 429/41
See application file for complete search history.

(56) References Cited

U.S. PATENT DOCUMENTS

| 4,329,157 | A |   | 5/1982  | Dobo et al. |         |
|-----------|---|---|---------|-------------|---------|
| 5,094,927 | A |   | 3/1992  | Baucke et al. |       |
| 5,759,712 | A |   | 6/1998  | Hockaday    |         |
| 5,993,984 | A | * | 11/1999 | Matsumura et al. | 429/17 |
| 6,649,293 | B1 | * | 11/2003 | Jones     | 429/26  |
| 2002/0048703 | A1 | | 4/2002 | Ohlsen et al. |      |

(Continued)

FOREIGN PATENT DOCUMENTS

EP    1 300 188 A2    4/2003

(Continued)

*Primary Examiner*—Patrick Ryan
*Assistant Examiner*—Ashley Kwon
(74) *Attorney, Agent, or Firm*—Oliff & Berridge, PLC

(57) ABSTRACT

A fuel cell of the invention has a hydrogen permeable metal layer, which is formed on a plane of an electrolyte layer that has proton conductivity and includes a hydrogen permeable metal. The fuel cell includes a higher temperature zone and a lower temperature zone that has a lower temperature than the higher temperature zone. The hydrogen permeable metal layer includes a lower temperature area A corresponding to the lower temperature zone and a higher temperature area B corresponding to the higher temperature zone. The lower temperature area A and the higher temperature area B have different settings of composition and/or layout of components. This arrangement effectively prevents potential deterioration of cell performance due to an uneven distribution of internal temperature of the fuel cell including the hydrogen permeable metal layer.

14 Claims, 9 Drawing Sheets

U.S. PATENT DOCUMENTS

2004/0043277 A1  3/2004  Ito et al.

FOREIGN PATENT DOCUMENTS

| | | |
|---|---|---|
| JP | A-05-299105 | 11/1993 |
| JP | A-07-185277 | 7/1995 |
| WO | WO 02/086994 A1 | 10/2002 |

* cited by examiner

FUEL CELL

TECHNICAL FIELD

The present invention relates to a fuel cell, and more specifically pertains to a fuel cell including an electrolyte layer and a hydrogen permeable metal layer.

BACKGROUND ART

Various types of fuel cells have been known. For example, a known fuel cell has a palladium metal membrane formed as the anode structure on a proton conductive electrolyte layer. In this fuel cell, the metal membrane formed as the anode structure on the electrolyte layer has hydrogen permeability and thus enables even a reformed gas of a relatively low purity to be supplied directly as the fuel gas to the anode.

The hydrogen permeable metal, such as palladium, is prone to hydrogen embrittlement especially at low temperatures. In the fuel cell having the hydrogen permeable metal layer, even a partial drop of the temperature accelerates hydrogen embrittlement of the hydrogen permeable metal layer in the area of the temperature decrease. Such hydrogen embrittlement may lower the cell performance. In the fuel cell having the hydrogen permeable metal layer, an excessively high temperature may also cause deterioration of the cell performance. Especially when the hydrogen permeable metal layer has a multi-layered laminate structure of different hydrogen permeable metals, the hydrogen permeable metal is alloyed under high temperature conditions. Alloying of the hydrogen-permeable metal undesirably lowers the cell performance. The fuel cell including the hydrogen permeable metal layer has an adequate range of operating temperature. A variation in internal temperature of the fuel cell causes an uneven temperature distribution and lowers the cell performance.

DISCLOSURE OF THE INVENTION

The object of the invention is thus to eliminate the drawbacks of the prior art technique and to prevent potential deterioration of cell performance due to an uneven distribution of internal temperature of a fuel cell including a hydrogen permeable metal layer.

In order to attain at least part of the above and the other related objects, the present invention is directed to a fuel cell having a hydrogen permeable metal layer, which is formed on a plane of an electrolyte layer that has proton conductivity and includes a hydrogen permeable metal. The fuel cell includes a higher temperature zone that is subjected to a high temperature and a lower temperature zone that is subjected to a lower temperature than the higher temperature zone. The hydrogen permeable metal layer includes a lower temperature area corresponding to the lower temperature zone and a higher temperature area corresponding to the higher temperature zone. The lower temperature area and the higher temperature area have different settings of either or both of composition and layout of components.

In the fuel cell of the invention, the hydrogen permeable metal layer has the higher temperature area and the lower temperature area, which respectively correspond to the higher temperature zone that is subjected to the high temperature and the lower temperature zone that is subjected to the lower temperature than the higher temperature zone in the fuel cell. The higher temperature area and the lower temperature area have different settings of the composition and/or the layout of components. This arrangement effectively prevents potential deterioration of the cell performance due to an uneven distribution of the internal temperature of the fuel cell.

In one aspect of the fuel cell of the invention, the hydrogen permeable metal layer has multiple layers of different hydrogen permeable metals in at least the lower temperature area. The different settings of either or both of the composition and the layout of components in the lower temperature area and the higher temperature area prevent potential deterioration of cell performance due to diffusion of the different hydrogen permeable metals between adjoining layers more actively in the higher temperature area than in the lower temperature area.

Even in the event of a temperature rise in the higher temperature area, this arrangement advantageously prevents potential deterioration of the cell performance due to diffusion of the different hydrogen permeable metals between adjoining layers.

In another aspect of the fuel cell of the invention, the higher temperature area is set to have a lower level of hydrogen permeation, compared with the lower temperature area.

In the fuel cell of this aspect, the level of hydrogen permeation in the higher temperature area is less than the level of hydrogen permeation in the lower temperature area. The less hydrogen permeation interferes with the progress of the electrochemical reaction in the higher temperature area and accordingly inhibits a temperature rise in the higher temperature area. This equalizes the temperature distribution in the hydrogen permeable metal layer and thereby prevents potential deterioration of the cell performance due to an uneven temperature distribution.

In the fuel cell of this aspect, the hydrogen permeable metal layer has a base material layer that is made of a group 5 metal or a group 5 metal-containing alloy, and a coat layer that is made of palladium or a palladium alloy and is formed on at least one face of the base material layer with a gas supply. The higher temperature area has a lower content of the group 5 metal in the base material layer, compared with the lower temperature area.

The lower content of the group 5 metal lessens the level of hydrogen permeation in the higher temperature area than the level of hydrogen permeation in the lower temperature area.

In the fuel cell of either of the above aspects, the hydrogen permeable metal layer has a base material layer that is made of a group 5 metal or a group 5 metal-containing alloy, a coat layer that is made of palladium or a palladium alloy and is formed on at least one face of the base material layer with a gas supply, and a diffusion control layer that is placed between the base material layer and the coat layer in at least the higher temperature area to control diffusion of the different metals. The diffusion control layer is designed to inhibit metal diffusion more actively in the higher temperature area than in the lower temperature area.

Even in the event of a temperature rise in the higher temperature area to give a temperature condition susceptible to metal diffusion, this structure sufficiently controls the metal diffusion in the higher temperature area and thus prevents potential deterioration of the cell performance. The diffusion control layer in the higher temperature area is set to more actively inhibit metal diffusion. This lessens the level of hydrogen permeation in the higher temperature area than the level of hydrogen permeation in the lower temperature area and equalizes the temperature distribution, thus effectively preventing potential deterioration of the cell performance.

In the fuel cell of either of the above aspects, the higher temperature area is homogeneously made of palladium or a palladium alloy. The temperature area has a base material layer that is made of a group 5 metal or a group 5 metal-containing alloy, and a coat layer that is made of palladium or a palladium alloy and is formed on at least one face of the base material layer with a gas supply.

Metal diffusion between adjoining layers of different metals does not occur in the higher temperature area that is homogeneously made of palladium or the palladium alloy. Even in the event of a temperature rise in the higher temperature area to give a temperature condition susceptible to metal diffusion, this structure effectively prevents potential deterioration of the cell performance due to metal diffusion. The homogeneous higher temperature area of palladium or the palladium alloy has a lower level of hydrogen permeation, compared with the lower temperature area including the base material layer of the group 5 metal or the group 5 metal-containing alloy. This structure advantageously equalizes the temperature distribution and prevents potential deterioration of the cell performance.

In the fuel cell of either of the above aspects, the hydrogen permeable metal layer has a base material layer that is made of a group 5 metal or a group 5 metal-containing alloy, and a coat layer that is made of palladium or a palladium alloy and is formed on at least one face of the base material layer with a gas supply. The coat layer in the higher temperature area has a greater thickness than a thickness of the coat layer in the lower temperature area.

Palladium of the coat layer has an activity of dissociating hydrogen molecules during permeation through the hydrogen permeable metal layer. Diffusion of the group 5 metal from the base material layer into the coat layer lowers the activity of dissociating hydrogen molecules and accordingly lessens the level of hydrogen permeation. Even in the event of diffusion of the group 5 metal to the boundary between the base material layer and the coat layer, the surface of the thick coat layer desirably maintains the activity of dissociating hydrogen molecules. This structure thus effectively prevents potential deterioration of the cell performance due to metal diffusion. The thick coat layer lessens the level of hydrogen permeation in the higher temperature area, thus equalizing the temperature distribution to prevent potential deterioration of the cell performance.

In still another preferable aspect of the fuel cell of the invention, the different settings of either or both of the composition and the layout of components in the lower temperature area and the higher temperature area inhibit hydrogen embrittlement under a low temperature condition more actively in the lower temperature area than in the higher temperature area.

This structure inhibits hydrogen embrittlement in the lower temperature area under the low temperature condition, thus preventing potential deterioration of the cell performance.

In the fuel cell of this aspect, at least the lower temperature area is made of an alloy containing a hydrogen permeable metal and has a lower content of the hydrogen permeable metal than a content of the hydrogen permeable metal in the higher temperature area.

The lower content of the hydrogen permeable metal in the lower temperature area causes less hydrogen embrittlement in the lower temperature area than in the higher temperature area.

In the fuel cell having any of the above structures, the higher temperature area and the lower temperature area are formed on an identical plane of the hydrogen permeable metal layer included in the fuel cell as a unit cell of a fuel cell stack.

This structure effectively prevents potential deterioration of the cell performance due to an uneven temperature distribution on the identical plane of the hydrogen permeable metal layer.

The fuel cell of this structure may further have a coolant flow path through which a coolant passes. The lower temperature area is provided in a region near to an inlet of the coolant into the unit cell, on the identical plane of the hydrogen permeable metal layer.

The temperature drops at the inlet of the coolant. This layout of the lower temperature area accordingly prevents potential deterioration of the cell performance due to a temperature decrease caused by the inflow of the coolant.

In the fuel cell of this structure, the lower temperature area is provided in a region near to an inlet of a low temperature fluid having a temperature difference of or over a preset level from an average operating temperature of the fuel cell stack, on the identical plane of the hydrogen permeable metal layer.

The lower temperature area is provided in the vicinity of the inlet of the low temperature fluid, which lowers the temperature at the inlet. This layout effectively prevents potential deterioration of the cell performance due to a temperature decrease caused by the inflow of the low temperature fluid.

In the fuel cell having any of the above structures, a number of the fuel cells as unit cells are laminated to form a fuel cell stack, and the hydrogen permeable metal layer included in each unit cell of the fuel cell stack has the higher temperature area and the lower temperature area according to a total temperature distribution of the whole fuel cell stack.

This structure effectively prevents potential deterioration of the cell performance due to an uneven temperature distribution in the whole fuel cell stack.

In the fuel cell of this structure, the hydrogen permeable metal layer has the lower temperature area provided at a position corresponding to an outer periphery of the fuel cell stack.

Heat dissipation lowers the temperature in the outer periphery of the fuel cell stack. This structure thus effectively prevents potential deterioration of the cell performance due to an uneven temperature distribution caused by heat dissipation.

The technique of the invention is not restricted to the fuel cell having any of the above structures, but is also attained by diversity of other applications, for example, a fuel cell system or a power supply device including the fuel cells of the invention, as well as a moving body with the fuel cells of the invention mounted thereon as a driving energy source.

BEST MODES OF CARRYING OUT THE INVENTION

One mode of carrying out the invention is described below as a preferred embodiment with referring drawings.

A. Structure of Fuel Cell

Figure 1:
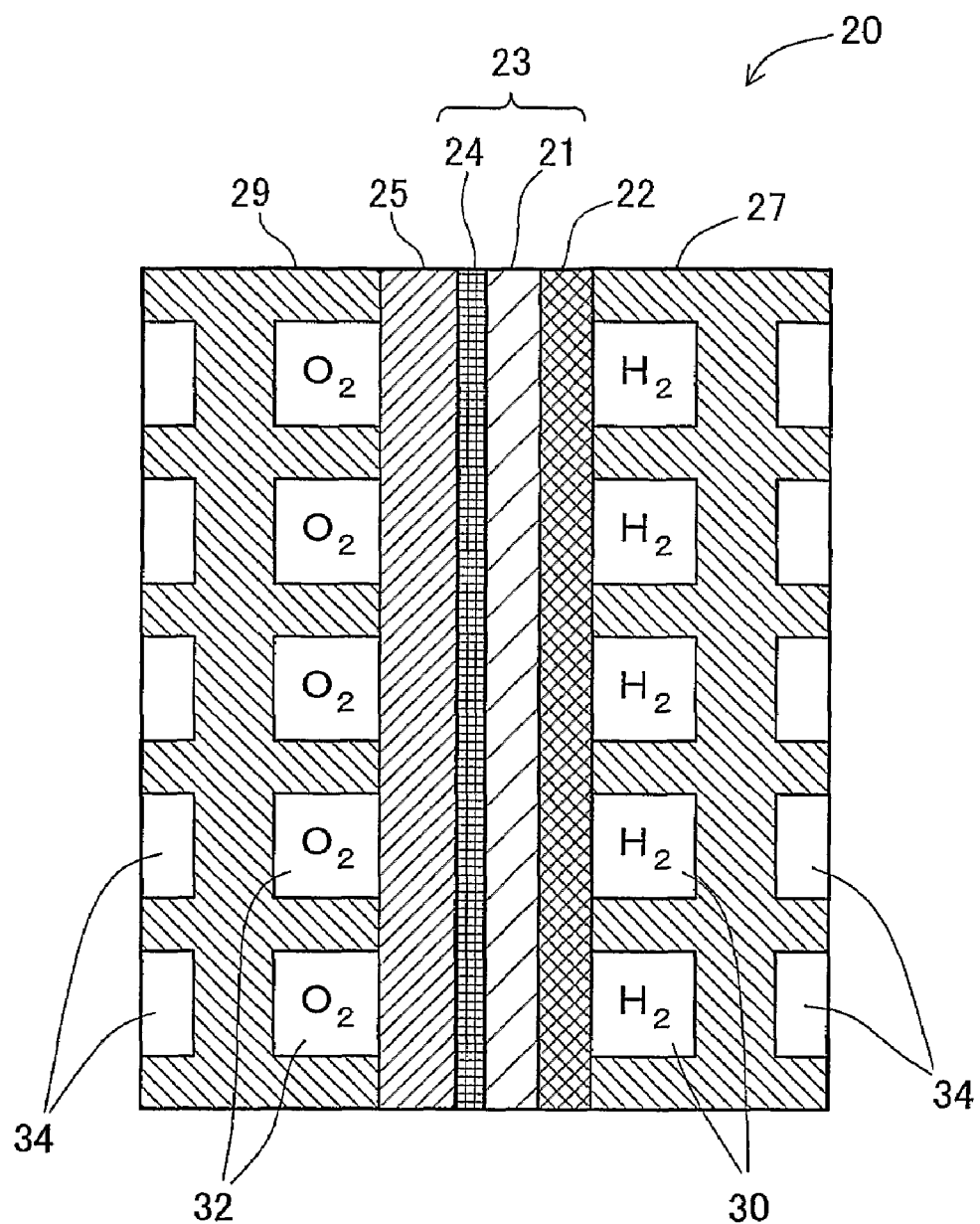
FIG. 1 is a sectional view schematically illustrating the structure of a unit fuel cell 20 in one embodiment of the invention.

FIG. 1 is a sectional view schematically illustrating the structure of a unit fuel cell 20 as a unit of fuel cells in one embodiment of the invention. The unit fuel cell 20 has an electrolyte module 23 including a hydrogen permeable metal layer 22 and an electrolyte layer 21, a catalyst layer 24 formed on the electrolyte layer 21, a cathode 25 formed on the catalyst layer 24, and a pair of gas separators 27 and 29. In-cell fuel gas flow paths 30 are defined by and formed between the gas separator 27 and the hydrogen permeable metal layer 22 to allow a flow of a hydrogen-containing fuel gas. Similarly, in-cell oxidizing gas flow paths 32 are defined by and formed between the gas separator 29 and the cathode 25 to allow a flow of an oxygen-containing oxidizing gas. The fuel cells of the invention have a stack structure including a number of the unit fuel cells 20 shown in FIG. 1. Coolant flow paths 34 for a flow of a coolant are formed between the adjacent gas separators 27 and 29 in each pair of adjoining unit cells 20.

The hydrogen permeable metal layer 22 is made of a metal having hydrogen permeability. The metal of the hydrogen permeable metal layer 22 may be, for example, palladium (Pd) or a Pd alloy. The hydrogen permeable metal layer 22 may otherwise be a multi-layered membrane including a base material of a group 5 metal like vanadium (V), niobium (Nb), or tantalum (Ta) or a group 5 metal-containing alloy and a Pd or Pd-containing alloy layer formed on at least one face of the base material. The structure of the hydrogen permeable metal layer 22 will be described in detail later.

The electrolyte layer 21 is made of a ceramic proton conductor, for example, $BaCeO_3$ or $SrCeO_3$. The electrolyte layer 21 is provided by depositing such a solid oxide to form a thin film on the hydrogen permeable metal layer 22. Any of various known techniques, such as physical vapor deposition (PVD), chemical vapor deposition (CVD), and sputtering, may be applied to thin-film deposition. The film of the electrolyte layer 21 is formed on the dense hydrogen permeable metal layer 22 and is thus sufficiently made thin to have a significantly reduced membrane resistance of the solid oxide. The fuel cell 20 of this structure is accordingly driven in an operating temperature range of approximately 200 to 600° C., which is significantly lower than the operating temperature range of the prior art polymer electrolyte fuel cell.

The catalyst layer 24 functions to accelerate the electrochemical reaction proceeding on the cathode 25 and contains a noble metal, such as platinum (Pt). The cathode 25 is a gas diffusion electrode of a conductive material having gas permeability, for example, a porous metal foam or metal mesh, carbon felt, carbon paper. The catalyst layer 24 may be provided by making the metal catalyst, for example, Pt carried on one plane of the cathode 25 facing to the electrolyte layer 21 or by depositing the metal catalyst to form a thin film on the electrolyte layer 21.

The gas separators 27 and 29 are gas-impermeable members made of a conductive material like carbon or a metal. The gas separators 27 and 29 are preferably made of a similar material to that of the cathode 25 that is in contact with the gas separator 29. The gas separators 27 and 29 have specific patterned surfaces to define and form in-cell and inter-cell fluid flow paths.

The fuel gas supplied to the fuel cells may be a hydrogen-rich gas obtained by reforming an adequate hydrocarbon fuel or a high-purity hydrogen gas. The oxidizing gas supplied to the fuel cells is typically the air. The coolant flowing through the fuel cells may be a liquid like water or a gas like the air. The fuel gas used in this embodiment is a reformed gas at the temperature of approximately 400° C., and the oxidizing gas and the coolant are the air at the temperature of approximately 25° C. In the fuel cells of this embodiment, the coolant flow paths 34 are formed between every pair of adjoining unit cells 20 as shown in FIG. 1. The coolant flow paths 34 may alternatively be formed at intervals of a preset number of unit cells 20.

B. Structure of Hydrogen Permeable Metal Layer

The electrochemical reactions generate heat in the process of power generation of the fuel cell. The coolant is flowed through the fuel cell as mentioned above to remove the heat and prevent an excess rise of the internal temperature of the fuel cell. The flows of the oxidizing gas and the fuel gas, as well as the flow of the coolant through the fuel cell may cause an uneven distribution of the internal temperature. In the fuel cell of this embodiment, the structure of the hydrogen permeable metal layer 22 is designed by taking into account the uneven distribution of the internal temperature due to the flows of such fluids.

Figure 2:
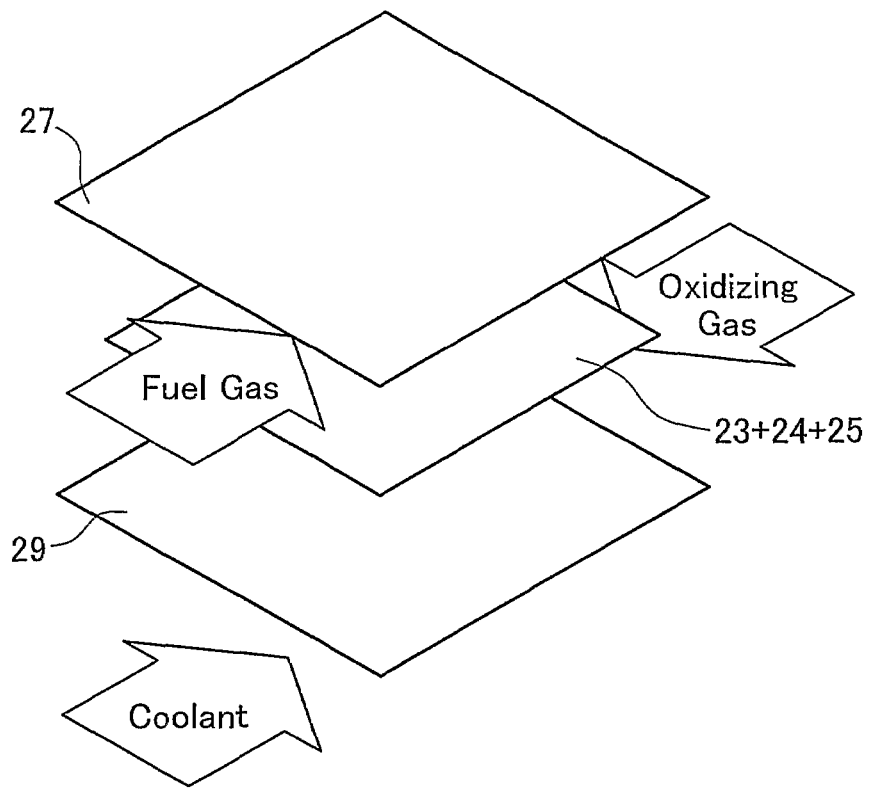
FIG. 2 schematically shows the flows of fluids in one unit fuel cell 20 of the embodiment.

Prior to the structure of the hydrogen permeable metal layer 22, the description regards the flows of fluids in the fuel cell and the distribution of the internal temperature. The specific patterns formed on the faces of the gas separators 27 and 29 define the flow paths to lead the total flows of the fuel gas, the oxidizing gas, and the coolant respectively in preset directions. For example, the flow paths may include mutually parallel multiple grooves as shown in FIG. 1, although the flow paths are not restricted to the mutually parallel multiple grooves. FIG. 2 schematically shows the flows of such fluids in one unit fuel cell 20 of the embodiment. In each unit fuel cell 20 of the embodiment, the flow of the fuel gas is opposite to the flow of the oxidizing gas, while the flow of the coolant is parallel to the flow of the fuel gas.

Figure 3:
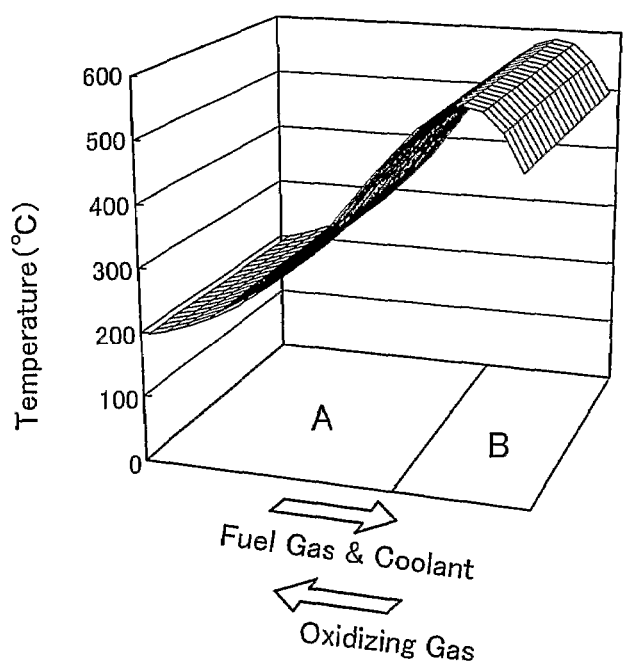
FIG. 3 shows a temperature distribution on a unit cell plane in the fuel cell of the embodiment.

FIG. 3 shows a temperature distribution on a unit cell plane in the fuel cell of this embodiment. The bottom face of the drawing represents a unit cell plane. The variation in temperature on the unit cell plane is expressed by the height from the unit cell plane. The open arrows represent the flow directions of the respective fluids. As shown in FIG. 3, the internal temperature of the unit cell is low in an upstream region in the vicinity of the inlets of the fuel gas and the coolant, gradually increases toward the downstream, and slightly decreases in a downstream region in the vicinity of the inlet of the oxidizing gas. The temperature distribution in the fuel cell may be examined experimentally or may be simulated with settings of various conditions including the type, the flow rate, the temperature, and the flow direction of the fluid and the materials of the respective constituents of the fuel cell.

The hydrogen permeable metal layer 22 included in each unit fuel cell 20 of the embodiment has a lower temperature area A and a higher temperature area B according to the temperature distribution shown in FIG. 3. The layout of the lower temperature area A and the higher temperature area B in the hydrogen permeable metal layer 22 is shown on the unit cell plane of FIG. 3. The lower temperature area A is provided in a region upstream of the flows of the fuel gas and the coolant, while the higher temperature area B is provided in a region downstream of the flows of the fuel gas and the coolant as shown in FIG. 3. The lower temperature area A and the higher temperature area B are set according to the temperature distribution of FIG. 3 as an area expected to have the temperature of not higher than a preset level (for example, 400° C.) and an area expected to have the temperature of higher than the preset level.

Figure 4:
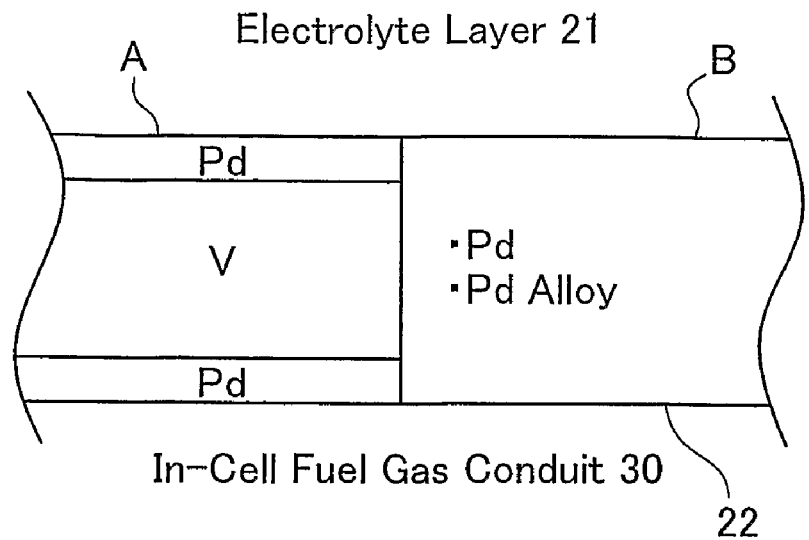
FIG. 4 schematically illustrates the cross section of a hydrogen permeable metal layer 22 in the unit fuel cell 20 of the embodiment.

FIG. 4 schematically illustrates the cross section of the hydrogen permeable metal layer 22 in the unit fuel cell 20 of this embodiment. The lower temperature area A of the hydrogen permeable metal layer 22 has a three-layered structure including a base material layer of a group 5 metal, such as vanadium (V) or a group 5 metal-containing alloy, such as a V alloy, and coat layers of Pd or a Pd alloy formed on both faces of the base material layer. The higher temperature area B of the hydrogen permeable metal layer 22 is made of Pd or a Pd alloy.

In the fuel cell of the embodiment structured as discussed above, the hydrogen permeable metal layer 22 is designed to have the lower temperature area A and the higher temperature area B according to the distribution of the inner temperature in the course of power generation of the fuel cell. This arrangement effectively prevents potential deterioration of the cell performances, due to the uneven distribution of the internal temperature of the fuel cell. Among various hydrogen permeable metals, group 5 metals like V and group 5 metal-containing alloys have the higher hydrogen permeability than Pd and Pd alloys. In the lower temperature area A, the coat layers containing Pd, which has the dissociation activity of dissociating hydrogen molecules, are formed on the base material layer of the group 5 metal or the group 5 metal-containing alloy as described above. The lower temperature area A of this three-layered structure has the enhanced hydrogen permeability, compared with the higher temperature area B of the homogeneous metal layer of Pd or Pd alloy. The three-layered structure may, however, cause metal diffusion on the boundaries between the base material layer and the respective coat layers to lower the hydrogen permeability. There is a higher potential for metal diffusion under higher temperature conditions. In the structure of the hydrogen permeable metal layer 22 of this embodiment, the higher temperature area B is made of the homogeneous metal layer and is thus free from metal diffusion. This structure ensures stable hydrogen permeation even under high temperature conditions and maintains the favorable performances of the hydrogen permeable metal layer 22.

In the structure of the hydrogen permeable metal layer 22 of this embodiment, the lower temperature area A has the higher hydrogen permeability than the higher temperature area B. Namely the electrochemical reactions more vigorously proceed in the lower temperature area A. This controls a temperature rise in the higher temperature area B relative to a temperature rise in the lower temperature area A and equalizes the temperature distribution in the whole hydrogen permeable metal layer 22, thus desirably preventing potential troubles due to the uneven distribution of temperature.

C. Other Structures of Hydrogen Permeable Metal Layer

C-1. Hydrogen Permeable Metal Layer of Second Structure

Figure 5:
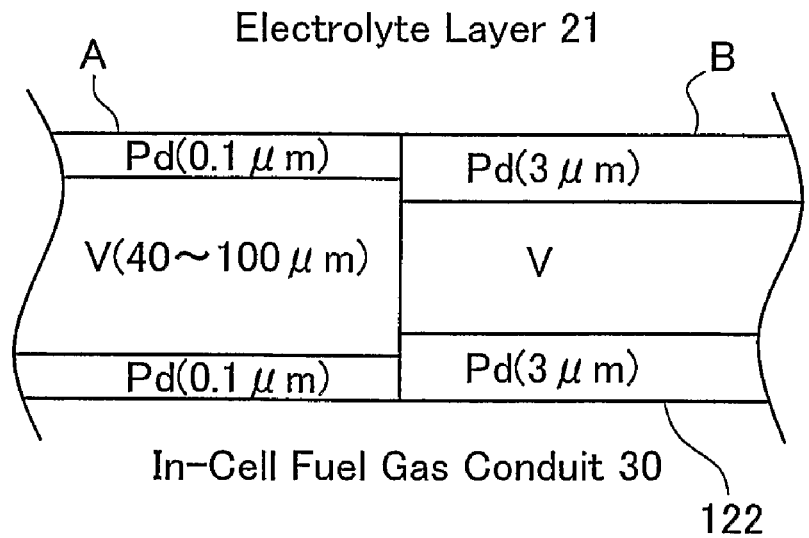
FIG. 5 schematically illustrates the cross section of another hydrogen permeable metal layer 122.

FIG. 5 schematically illustrates the cross section of another hydrogen permeable metal layer 122 of a second structure. Any of this and other hydrogen permeable metal layers discussed below may replace the hydrogen permeable metal layer 22 in the unit fuel cell 20 of the embodiment and has a lower temperature area A and a higher temperature area B in a similar layout to the layout in the hydrogen permeable metal layer 22. As shown in FIG. 5, the whole hydrogen permeable metal layer 122 has a three-layered structure of a base material layer and coat layers. The higher temperature area B has thicker coat layers than those of the lower temperature area A. In this second structure, the coat layers of the lower temperature area A are 0.1 μm thick Pd layers, while the coat layers of the higher temperature area B are 3 μm thick Pd layers.

The thicker coat layers effectively prevent potential deterioration of the cell performances due to metal diffusion in the higher temperature area B. Metal diffusion tends to occur at higher temperatures, and mainly causes the group 5 metal included in the base material layer to be diffused into the coat layers. The metal diffusion undesirably lowers the hydrogen molecule-dissociation activity of Pd in the coat layers. The sufficiently thick coat layers (for example, the thickness of not less than several μm) in the higher temperature area B effectively prevent diffusion of the group 5 metal to the surface of the coat layer, which faces to the in-cell fuel gas flow paths 30 and actually exerts the dissociation activity, thus maintaining the favorable cell performances.

In the hydrogen permeable metal layer 122 of the second structure, the higher temperature area B includes the thicker coat layers (Pd) layers having the low hydrogen permeability and the thinner base material layer (the group 5 metal layer) having the higher hydrogen permeability. The higher temperature area B accordingly has the lower hydrogen permeability than the lower temperature area A. The less hydrogen permeation desirably controls the electrochemical reactions to inhibit a temperature rise in the higher temperature area B, compared with the lower temperature area A. This advantageously equalizes the temperature distribution in the fuel cell. In this second structure, the thicknesses of the coat layers and the base material layer are abruptly changed on the boundary between the lower temperature area A and the higher temperature area B. The thicknesses of the coat layers and the base material layer may gradually vary from the lower temperature area A to the higher temperature area B.

C-2. Hydrogen Permeable Metal Layer of Third Structure

Figure 6:
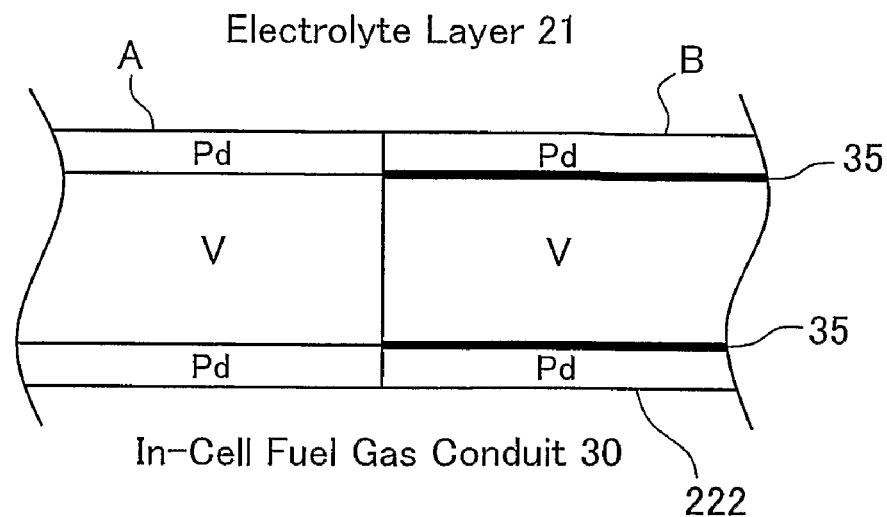
FIG. 6 schematically illustrates the cross section of another hydrogen permeable metal layer 222.

FIG. 6 schematically illustrates the cross section of another hydrogen permeable metal layer 222 of a third structure. The hydrogen permeable metal layer 222 of the third structure has a base material layer and coat layers formed on both faces of the base material layer, as shown in FIG. 6. The higher temperature area B further has diffusion control layers 35 placed between the base material layer and the respective coat layers. The diffusion control layer 35 may be a nickel or cobalt thin film or a ceramic thin film. The presence of the diffusion control layers 35 effectively controls metal diffusion between the base material layer and the respective coat layers. In the hydrogen permeable metal layer 222 of the third structure, the diffusion control layers 35 provided in the higher temperature area B effectively control metal diffusion, which tends to occur at higher temperatures, and thus desirably prevents potential deterioration of the cell performances. The presence of the diffusion control layers 35 depresses the hydrogen permeability and thereby the progress of the electrochemical reactions in the higher temperature area B, thus advantageously equalizing the temperature distribution in the fuel cell.

Figure 7:
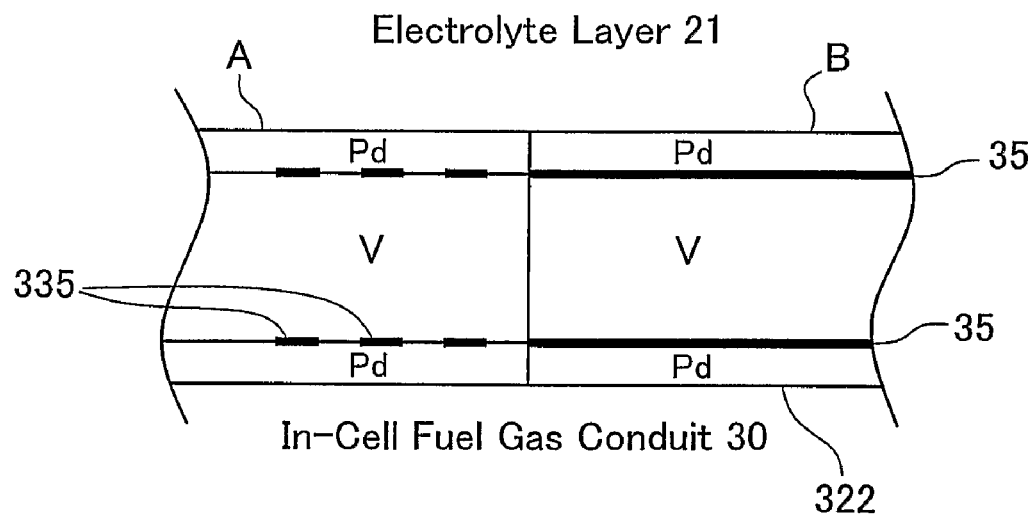
FIG. 7 schematically illustrates the cross section of another hydrogen permeable metal layer 322.

FIG. 7 schematically illustrates the cross section of another hydrogen permeable metal layer 322 as one modified example of the third structure. The hydrogen permeable metal layer 322 of this modified example has a base material layer, coat layers formed on both faces of the base material layer, and diffusion control layers provided between the base material layer and the respective coat layers, as shown in FIG. 7. In the hydrogen permeable metal layer 322 of the modified structure, the higher temperature area B has diffusion control layers 35 continuously formed on the boundaries between the base material layer and the respective coat layers, like the hydrogen permeable metal layer 222 of the third structure. The lower temperature area A, on the other hand, has diffusion control layers 335 discontinuously formed (for example, as multiple separate islands) on the boundaries between the base material layer and the respective coat layers. In this modified structure, the higher temperature area B has higher protection against metal diffusion and less hydrogen permeation than the lower temperature area A. This arrangement ensures the similar effects to those of the third structure.

The diffusion control layers may be formed discontinuously in both the lower temperature area A and the higher temperature area B. Discontinuous formation is preferable when the diffusion control layers are made of a material with no proton conductivity or a material with extremely low proton conductivity. In this case, the higher temperature area B is designed to have the wider total area of the diffusion control layers than the lower temperature area A to exert the similar effects. In continuous or discontinuous formation of the diffusion control layers, the higher temperature area B may be designed to have the thicker diffusion control layers than the lower temperature area A.

C-3. Hydrogen Permeable Metal Layer of Fourth Structure

Figure 8:
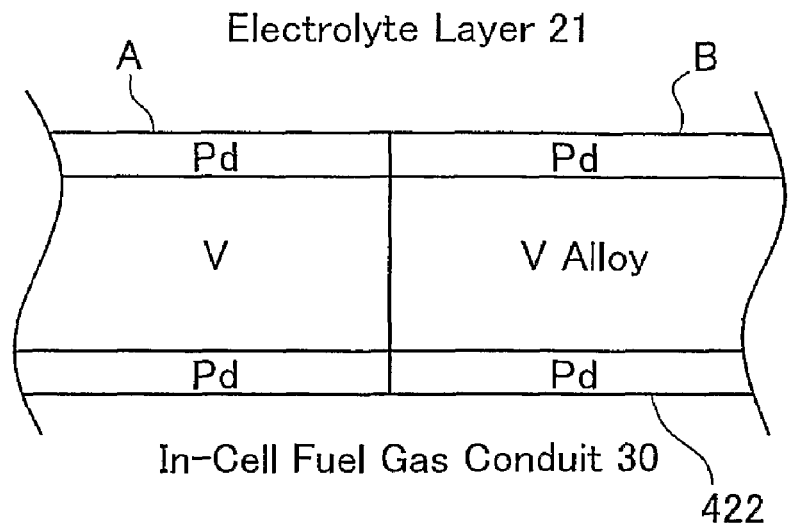
FIG. 8 schematically illustrates the cross section of another hydrogen permeable metal layer 422.

FIG. 8 schematically illustrates the cross section of another hydrogen permeable metal layer 422 of a fourth structure. The hydrogen permeable metal layer 422 of the fourth structure has a base material layer and coat layers formed on both faces of the base material layer, as shown in FIG. 8. In the hydrogen permeable metal layer 422, the base material layer of the higher temperature area B is made of a V alloy, while the base material layer of the lower temperature area A is made of high-purity V. The higher temperature area B has a lower content of V and thereby less hydrogen permeation than the lower temperature area A. This inhibits heat generation and equalizes the temperature distribution in the fuel cell. In one possible modification, the base material of the lower temperature area A is also made of a V alloy, and the V content of the V alloy in the base material of the higher temperature area B is set lower than the V content in the base material of the lower temperature area A. In general, similar effects are achieved by setting the lower content of the group 5 metal in the base material layer of the higher temperature area B than the content of the group 5 metal in the base material layer of the lower temperature area A. These effects may also be obtained by setting the lower Pd content in the coat layers of the higher temperature area B than the Pd content in the coat layers of the lower temperature area A. The settings of different V contents in the respective base layers, which make a greater contribution to the hydrogen permeability, however, have greater effect on equalization of the temperature distribution.

C-4. Hydrogen Permeable Metal Layer of Fifth Structure

Figure 9:
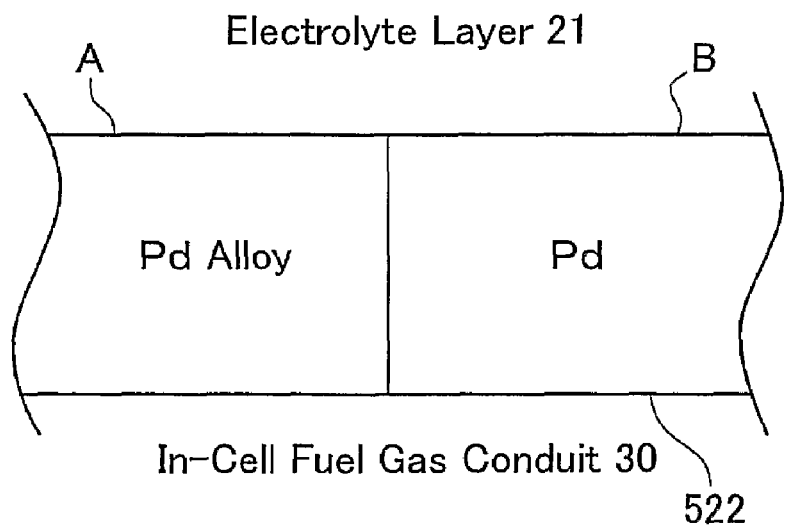
FIG. 9 schematically illustrates the cross section of another hydrogen permeable metal layer 522.

FIG. 9 schematically illustrates the cross section of another hydrogen permeable metal layer 522 of a fifth structure. The hydrogen permeable metal layer 522 of the fifth structure has a lower temperature area A of a Pd alloy and a higher temperature area of Pd, as shown in FIG. 9. In this structure, the lower temperature area A has a lower Pd content, which causes hydrogen embrittlement, than the Pd content of the higher temperature area B. The lower temperature area A accordingly has a lower potential for hydrogen embrittlement under low temperature conditions, compared with the higher temperature area B. Even in the event of an uneven temperature distribution in the fuel cell, this arrangement desirably inhibits hydrogen embrittlement in the lower temperature area A and thus prevents potential deterioration of the performances of the fuel cell.

Similar effects are achieved by setting the lower content of a hydrogen permeable metal in the lower temperature area A than the content of the hydrogen permeable metal in the higher temperature area B. For example, in the hydrogen permeable metal layer including the base material layer and the coat layers, the similar effect on inhibition of hydrogen embrittlement in the lower temperature area A is obtained by setting the lower content of the group 5 metal in the base material layer of the lower temperature area A than the content of the group 5 metal in the base material layer of the higher temperature area B or by setting the lower Pd content in the coat layers of the lower temperature area A than the Pd content in the coat layers of the higher temperature area B.

Setting the different contents of the hydrogen permeable metal in the lower temperature area A and the higher temperature area B seems to have two different effects on prevention of potential deterioration of the cell performances due to the uneven distribution of the internal temperature of the fuel cell. As shown in the fourth structure, setting the lower content of the hydrogen permeable metal in the higher temperature area B inhibits heat generation in the higher temperature area B. As shown in the fifth structure, on the other hand, setting the lower content of the hydrogen permeable metal in the lower temperature area A inhibits hydrogen embrittlement in the lower temperature area A under low temperature conditions. In the actual state, however, some specific effect is dominantly achieved according to the temperature and other affecting conditions of the fuel cell and the type and other affecting conditions of the hydrogen permeable metal. Setting the contents of the hydrogen permeable metal in the lower temperature area A and in the higher temperature area B according to the system conditions thus optimizes the effect on prevention of potential deterioration of the cell performances due to the uneven distribution of the internal temperature of the fuel cell.

The structures of the lower temperature area A and the higher temperature area B may be inverted in the hydrogen permeable metal layer 22 of the first structure shown in FIG. 4. This inverted structure has V, which is prone to hydrogen embrittlement, only in the higher temperature area B and thereby prevents potential deterioration of the cell performances due to hydrogen embrittlement. When setting different compositions and/or different layouts of the components in the hydrogen permeable metal layer exerts multiple different effects, the composition and/or the layout of the components is determined according to the concrete conditions in the fuel cell. The composition and/or the layout of components in the hydrogen permeable metal layer are comprehensively determined by taking into account the total effects including the metal diffusion control effect under high temperature conditions, the hydrogen embrittlement inhibition effect under the low temperature conditions, and hydrogen permeability control effect. Such determination effectively prevents potential deterioration of the cell performances due to the uneven distribution of the internal temperature of the fuel cell.

In any of the structures discussed above, the hydrogen permeable metal layer has the lower temperature area A and the higher temperature area B. In one possible modification, the hydrogen permeable metal layer may be divided into three or a greater number of areas and has one or more intermediate temperature areas. In this modified structure, the composition and/or the layout of components in the hydrogen permeable metal layer may be changed stepwise from the lower temperature area A through the intermediate temperature area to the higher temperature area B or may be changed non-stepwise but gradually from the lower temperature area A through the intermediate temperature area to the higher temperature area B according to the temperature distribution. Any of the structures discussed above may be adopted in combination.

D. Other Examples of Temperature Distribution

Figure 10:
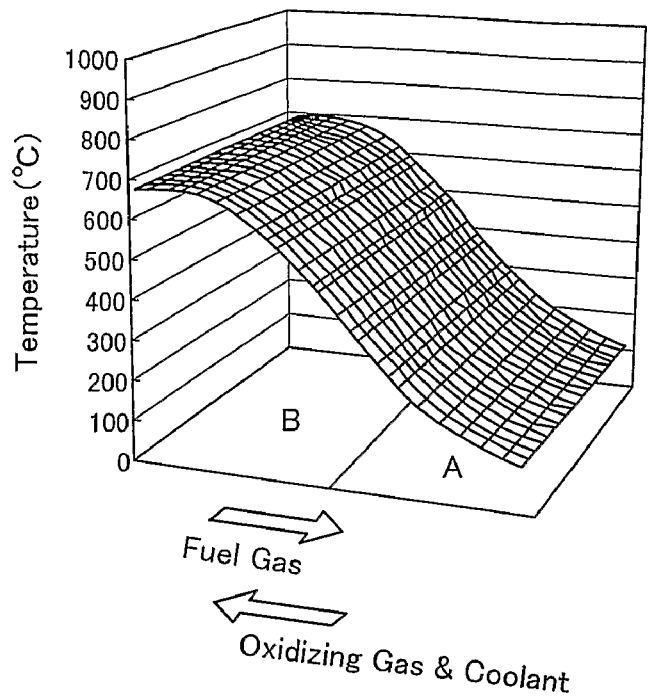
FIG. 10 shows a temperature distribution on a unit cell plane in another example of flow directions of fluids.

As shown in FIGS. 2 and 3, in the embodiment discussed above, the fuel gas and the coolant are flowed in the same direction, while the oxidizing gas is flowed in the direction opposite to the flows of the fuel gas and the coolant on the unit cell plane. The flow directions of the fluids are, however, not restricted to this embodiment. The temperature distribution in the fuel cell depends upon the flow directions of the fluids. FIG. 10 shows a temperature distribution on a unit cell plane in another example of flow directions of fluids. In the example of FIG. 10, the oxidizing gas and the coolant are flowed in a direction opposite to the flow of the fuel gas. In this arrangement, the temperature reaches the maximum in the vicinity of the inlet of the fuel gas and gradually decreases toward the downstream. Namely the temperature reaches the minimum in the vicinity of the inlets of the low temperature oxidizing gas and low temperature coolant. In the example of FIG. 10, a higher temperature area B is provided in a region in the vicinity of the inlet of the fuel gas, and a lower temperature area A is provided in a region downstream of the flow of the fuel gas. Any of the structures of the hydrogen permeable metal layer discussed above is applied to the lower temperature area A and the higher temperature area B of this layout to exert the similar effects. The supply of fuel gas fed to the fuel cell has the higher temperature than the supply of oxidizing gas. The temperature is thus not significantly lowered in the vicinity of the inlet of the fuel gas in the example of FIG. 10, while the temperature is significantly lowered in the vicinity of the inlet of the oxidizing gas in the example of FIG. 3. In general, a lower temperature area is provided in the vicinity of an inlet of a low temperature fluid, which has a temperature difference of or over a preset level from the average operating temperature of the fuel cell and functions to lower the internal temperature of the fuel cell.

Figure 11:
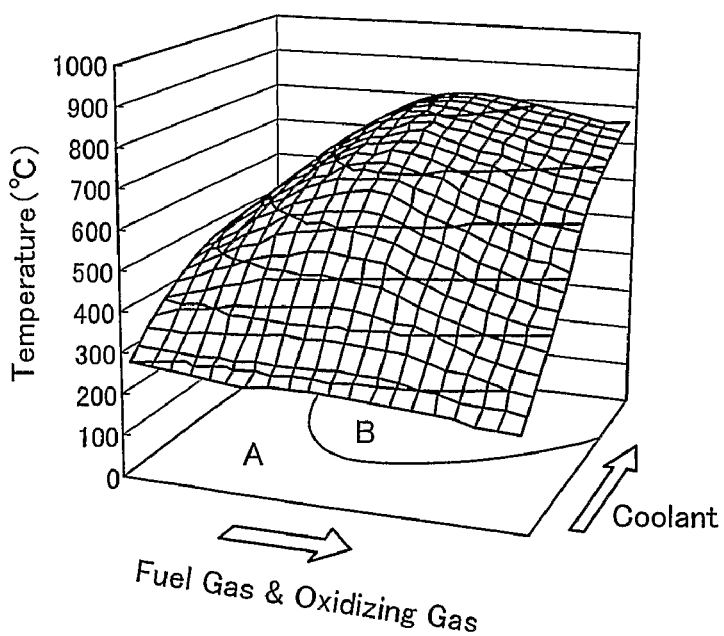
FIG. 11 shows a temperature distribution on a unit cell plane in still another example of flow directions of fluids.

FIG. 11 shows a temperature distribution on a unit cell plane in still another example of flow directions of fluids. In the example of FIG. 11, the fuel gas and the oxidizing gas are flowed in an identical direction, while the coolant is flowed in a direction perpendicular to the flows of the fuel gas and the oxidizing gas. The supplies of fuel gas and oxidizing gas have lower temperatures than the internal temperature of the fuel cell. The temperature accordingly rises in a downstream region of the flows of the fuel gas and the oxidizing gas on the unit cell plane. The temperature also reaches the minimum in the vicinity of the inlet of the coolant. In the example of FIG. 11, a higher temperature area B is provided in a region downstream of the flows of the oxidizing gas and the fuel gas and downstream of the flow of the coolant, while a lower temperature area A is provided in a residual region. Any of the structures of the hydrogen permeable metal layer discussed above is applied to the lower temperature area A and the higher temperature area B of this layout to exert the similar effects.

Figure 12:
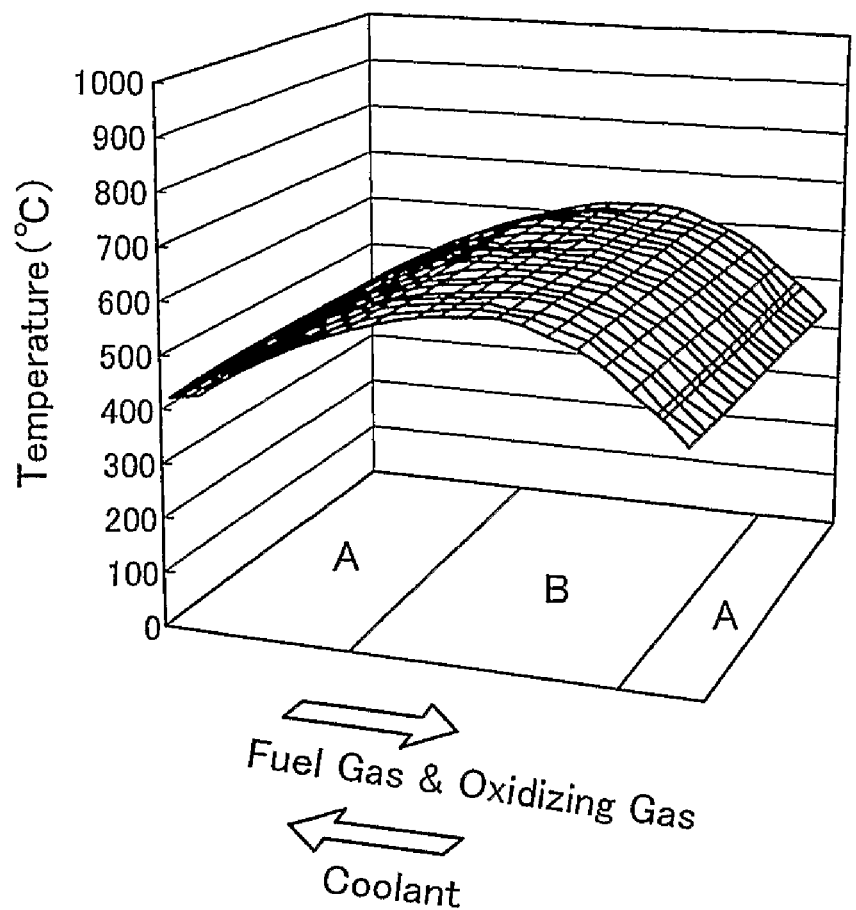
FIG. 12 shows a temperature distribution on a unit cell plane in another example of flow directions of fluids.

FIG. 12 shows a temperature distribution on a unit cell plane in another example of flow directions of fluids. In the example of FIG. 12, the fuel gas and the oxidizing gas are flowed in an identical direction, while the coolant is flowed in a direction opposite to the flows of the fuel gas and the oxidizing gas. The supplies of fuel gas and oxidizing gas have lower temperatures than the internal temperature of the fuel cell. The temperature accordingly rises in a downstream region of the flows of the fuel gas and the oxidizing gas on the unit cell plane. The temperature also reaches the minimum in the vicinity of the inlet of the coolant. In the example of FIG. 12, lower temperature areas A are provided in regions in the vicinities of inlets of the respective fluids, while a higher temperature area B is provided in a residual region. Any of the structures of the hydrogen permeable metal layer discussed above is applied to the lower temperature areas A and the higher temperature area B of this layout to exert the similar effects.

In general, the temperature is low in the vicinity of an inlet of a low temperature fluid. The lower temperature area A is accordingly provided in the vicinity of the inlet of the low temperature fluid, for example, in the vicinity of the inlets of the coolant and/or the oxidizing gas. The higher-temperature reformed gas supplied from a reformer may be replaced by lower-temperature hydrogen gas to be used for the fuel gas. In this case, the temperature is lowered in an upstream region of the flow of the fuel gas, and a lower temperature area is extended to a wider range from the vicinity of the inlet of the fuel gas. The fuel cell may have multiple cooling systems for the flows of multiple different coolants. In this structure, a distribution of the internal temperature of the fuel cell depends upon the temperatures of the respective coolants and the efficiencies of heat exchange of the respective coolants. The structure of making the fuel gas, the oxidizing gas, and the coolant flow in the respective fixed directions may be replaced by a modified structure of changing the flow directions in the middle. In any structure, the distribution of the internal temperature may be simulated with settings of the flow conditions of the respective fluids or may be examined experimentally.

The above description regards the uneven temperature distribution on the unit cell plane with reference to the examples of FIG. 3 and FIGS. 10 to 12. With regard to a fuel cell stack or a laminate of multiple unit cells, it is preferable to determine the layout of a lower temperature area A and a higher temperature area B in the hydrogen permeable metal layer of each unit cell by taking into account a total temperature distribution in the whole stack structure including the laminating direction of unit cells.

Figure 13:
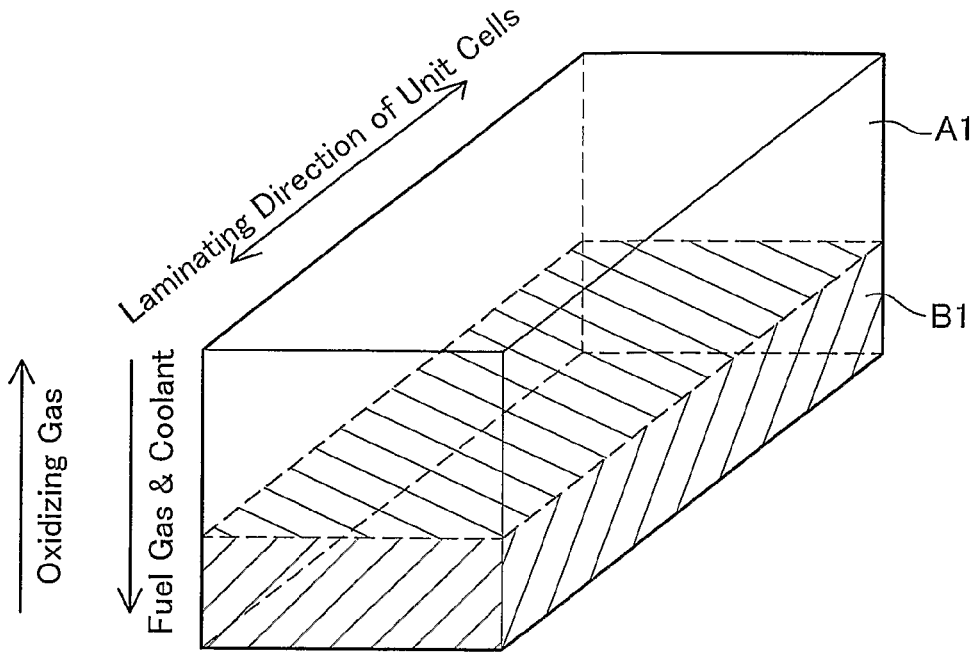
FIG. 13 shows a layout of a lower temperature zone A1 and a higher temperature zone B1 in the whole stack structure of laminated unit cells.
Figure 14:
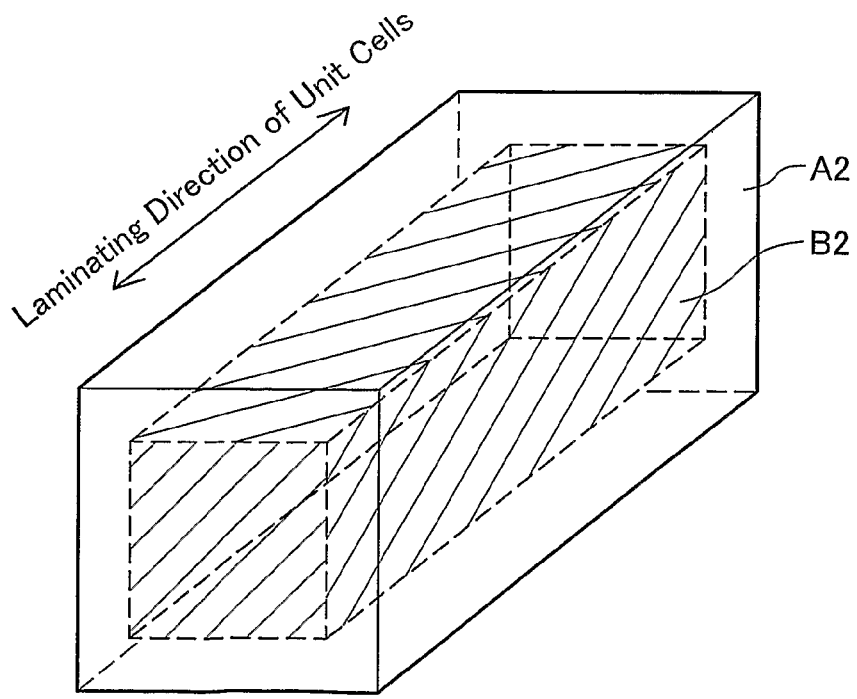
FIG. 14 shows a layout of a lower temperature zone A2 and a higher temperature zone B2 in the whole stack structure of laminated unit cells.

For example, on the assumption that only the conditions of the respective fluids affect the temperature distribution in the fuel cell stack and that each unit cell has the temperature distribution shown in FIG. 3, the hydrogen permeable metal layer of each unit cell in the stack structure is designed to have the lower temperature area A and the higher temperature area B in the layout of FIG. 3. FIG. 13 shows a layout of a lower temperature zone A1 corresponding to the lower temperature areas A of the hydrogen permeable metal layers and a higher temperature zone B1 corresponding to the higher temperature areas B of the hydrogen permeable metal layers in the whole stack structure of the laminated unit cells. In the stack structure, the outer zone generally has the lower temperature, because of heat dissipation. FIG. 14 shows a layout of a lower temperature zone A2 of not higher than a preset temperature level and a higher temperature zone B2 of higher than the preset temperature level in the whole stack structure of the laminated unit cells by taking into account only heat dissipation. The preferable procedure accordingly takes into account possible effects under a combination of expected conditions to specify a temperature distribution of the whole stack structure. For example, the temperature distribution under the conditions of the fluid flows shown in FIG. 13 is combined with the temperature distribution under the conditions of heat dissipation shown in FIG. 14. The procedure then determines the layout of the lower temperature area A and the higher temperature area B in the hydrogen permeable metal layer of each unit cell, based on the temperature distribution of the whole stack structure. The internal temperature of the fuel cells is affected by a temperature distribution in the surroundings of the fuel cells. For example, when some heat-generating device is located in a neighborhood of the fuel cells, the closer distance to the heat-generating device gives the higher internal temperature of the fuel cells. The enhanced effects are thus achievable by setting the layout of the lower temperature area A and the higher temperature area B in the hydrogen permeable metal layer of each unit cell by taking into account the various factors affecting the distribution of the internal temperature of the fuel cells. The layout of the lower temperature areas A and the higher temperature areas B in the hydrogen permeable metal layers of the respective unit cells is determined according to the temperature distribution of the whole stack structure. The whole hydrogen permeable metal layer may thus be set to the lower temperature area A or to the higher temperature area B in part of the stack structure of the laminated unit cells.

E. Modifications

The embodiment and various examples discussed above are to be considered in all aspects as illustrative and not restrictive. There may be many modifications, changes, and alterations without departing from the scope or spirit of the main characteristics of the present invention. Some examples of possible modification are given below.

(1) In the structures of FIGS. 4 to 8, the hydrogen permeable metal layer has the base material layer of the group 5 metal and the Pd-containing coat layers formed on both faces of the base material layer. In one modified structure, a coat layer may be formed on only one face of the base material layer on the side of the in-cell fuel gas flow paths 30. Another catalyst layer of a noble metal or a noble metal alloy may be formed between the hydrogen permeable metal layer and the electrolyte layer 21 according to the requirements. The hydrogen permeable metal layer may be formed on a ceramic base member. In this modified structure, the ceramic base member is located between the hydrogen permeable metal layer and the gas separator 27.

(2) In the unit fuel cell 20 of the embodiment shown in FIG. 1, the hydrogen permeable metal layer 22 formed on the electrolyte layer 21 functions as the anode structure. The anode structure and the cathode structure may be inverted. A hydrogen permeable metal layer having any of the structures discussed above is formed on one face of the electrolyte layer 21 to function as the cathode structure, while an anode and a catalyst layer, which are similar to the catalyst layer 24 and the cathode 25, are formed on the other face of the electrolyte layer 21. A catalyst layer may further be formed between the electrolyte layer 21 and the hydrogen permeable metal layer of the cathode structure.

Figure 15:
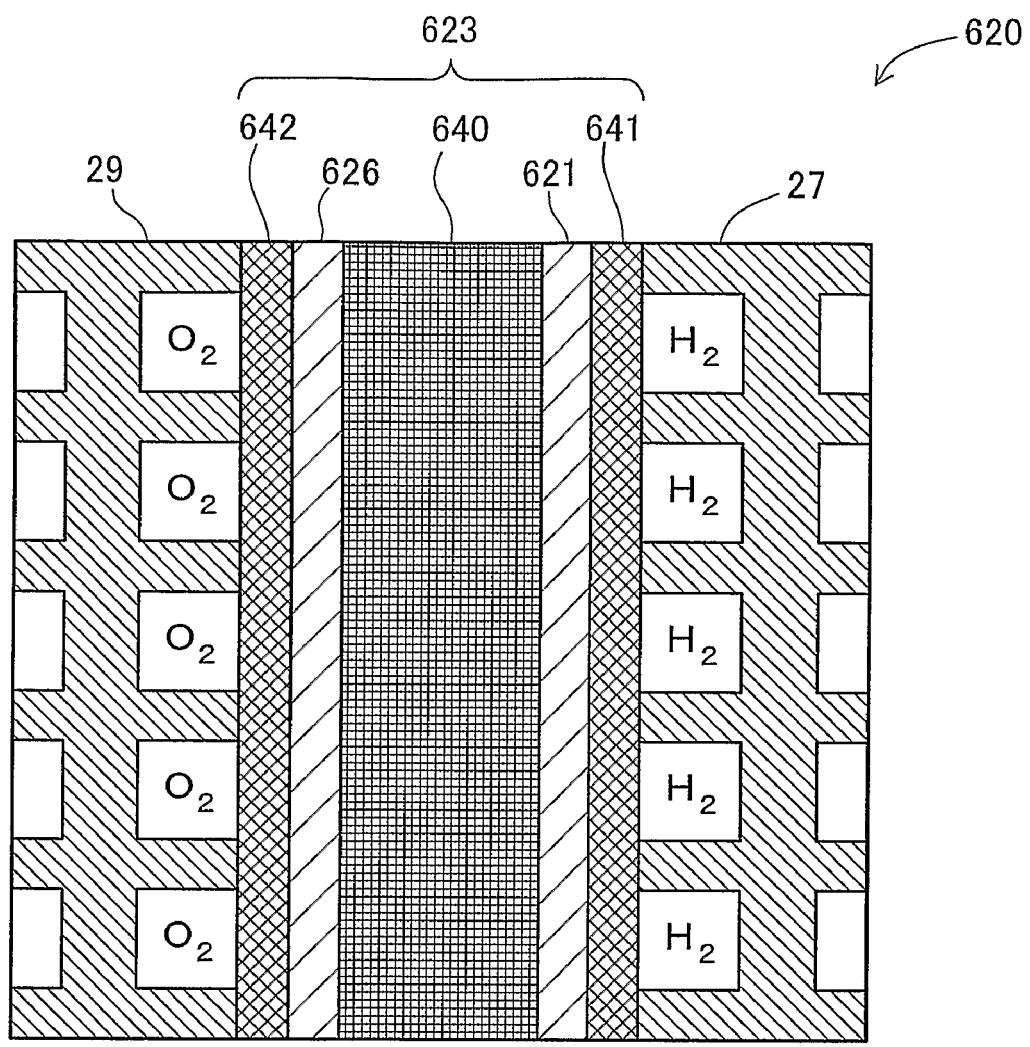
FIG. 15 is a sectional view schematically illustrating the structure of another unit fuel cell 620.

In another modified example, an electrolyte module may include multiple electrolyte layers and/or multiple hydrogen permeable metal layers. FIG. 15 is a sectional view schematically illustrating the structure of a unit fuel cell 620 having a five-layered electrolyte module 623. The electrolyte module 623 includes a base material layer 640 made of a group 5 metal or a group 5 metal-containing alloy, electrolyte layers 621 and 626 that are thin films of the solid oxide, like the electrolyte layer 21, and are formed on both faces of the base material layer 640, and coat layers 641 and 642 that are made of Pd or a Pd alloy and are formed outside the respective electrolyte layers 621 and 626. The technique of the invention is applicable to this modified structure to exert the similar effects. For example, a lower temperature area A and a higher temperature area B are set to have different contents of the group 5 metal in the base material layer 640 or different contents of Pd in the coat layers 641 and 642.

The structure of FIG. 15 may further be modified in various ways. For example, one or both of the coat layers 641 and 642 may be omitted. In the coat-layer-free structure, a catalyst layer is formed on each plane of the electrolyte module facing to the in-cell gas flow paths. A porous electrode member is formed outside the catalyst layer to be in contact with the gas separator.

One of the electrolyte layers 621 and 626 may be omitted from the structure of FIG. 15. In this modified structure with omission of one of the electrolyte layers 621 and 626, a diffusion control layer is formed between the base material layer 640 and the coat layer to have different patterns in a lower temperature area A and in a higher temperature area B like the modified example of the third structure shown in FIG. 7. The higher temperature area B may otherwise be designed to have a homogeneous Pd or Pd alloy layer like the structure of the embodiment shown in FIG. 4, in place of the base material layer 640 and the coat layer.

(3) The technique of the invention is not restricted to the polymer electrolyte fuel cells but may be applied to any fuel cells including a proton conductive electrolyte layer and a hydrogen permeable metal layer in contact with the electrolyte layer, for example, proton-exchange membrane fuel cells. In the proton-exchange membrane fuel cells, dense hydrogen permeable metal layers are formed on both faces of a solid polymer membrane to hold the water content of the solid polymer membrane. This structure attains the higher operating temperature, compared with the conventional structure of the proton-exchange membrane fuel cells. The solid polymer membrane may be replaced by an electrolyte layer of a hydrated ceramic, glass, or alumina membrane, for example, a hydrated heteropoly acid or β-alumina membrane. The technique of the invention is preferably applicable to the fuel cell of this structure and sets different compositions and/or different layouts of components in a lower temperature area A and a in a higher temperature area B of each hydrogen permeable metal layer.

The invention claimed is:

1. A fuel cell including a higher temperature zone that is subjected to a high temperature and a lower temperature zone that is subjected to a lower temperature than the higher temperature zone, said fuel cell comprising:

a plane of an electrolyte layer that has proton conductivity; and a single hydrogen permeable metal layer that is formed on the electrolyte layer and includes a hydrogen permeable metal, wherein the hydrogen permeable metal layer further includes a lower temperature area corresponding to the lower temperature zone and a higher temperature area corresponding to the higher temperature zone, and the lower temperature area and the higher temperature area have different settings of either or both of composition and layout of components.

2. A fuel cell in accordance with claim 1, wherein the hydrogen permeable metal layer has multiple layers of different hydrogen permeable metals in at least the lower temperature area, and
the different settings of either or both of the composition and the layout of components in the lower temperature area and the higher temperature area prevent potential deterioration of cell performance due to diffusion of the different hydrogen permeable metals between adjoining layers more actively in the higher temperature area than in the lower temperature area.

3. A fuel cell in accordance with claim 1, wherein the higher temperature area is set to have a lower level of hydrogen permeation, compared with the lower temperature area.

4. A fuel cell in accordance with claim 3, wherein the hydrogen permeable metal layer has a base material layer that is made of a group 5 metal or a group 5 metal-containing alloy, and a coat layer that is made of palladium or a palladium alloy and is formed on at least one face of the base material layer with a gas supply, and
the higher temperature area has a lower content of the group 5 metal in the base material layer, compared with the lower temperature area.

5. A fuel cell in accordance with claim 2, wherein the hydrogen permeable metal layer has a base material layer that is made of a group 5 metal or a group 5 metal-containing alloy, a coat layer that is made of palladium or a palladium alloy and is formed on at least one face of the base material layer with a gas supply, and a diffusion control layer that is placed between the base material layer and the coat layer in at least the higher temperature area to control diffusion of the different metals, and
the diffusion control layer is designed to inhibit metal diffusion more actively in the higher temperature area than in the lower temperature area.

6. A fuel cell in accordance with claim 2, wherein the higher temperature area is homogeneously made of palladium or a palladium alloy, and
the lower temperature area has a base material layer that is made of a group 5 metal or a group 5 metal-containing alloy, and a coat layer that is made of palladium or a palladium alloy and is formed on at least one face of the base material layer with a gas supply.

7. A fuel cell in accordance with claim 2, wherein the hydrogen permeable metal layer has a base material layer, that is made of a group 5 metal or a group 5 metal-containing alloy, and a coat layer that is made of palladium or a palladium alloy and is formed on at least one face of the base material layer with a gas supply, and
the coat layer in the higher temperature area has a greater thickness than a thickness of the coat layer in the lower temperature area.

8. A fuel cell in accordance with claim 1, wherein the different settings of either or both of the composition and the layout of components in the lower temperature area and the higher temperature area inhibit hydrogen embrittlement under a low temperature condition more actively in the lower temperature area than in the higher temperature area.

9. A fuel cell in accordance with claim 8, wherein at least the lower temperature area is made of an alloy containing a hydrogen permeable metal
and has a lower content of the hydrogen permeable metal than a content of the hydrogen permeable metal in the higher temperature area.

10. A fuel cell in accordance with claim 1, wherein the higher temperature area and the lower temperature area are formed on an identical plane of the hydrogen permeable metal layer included in said fuel cell as a unit cell of a fuel cell stack.

11. A fuel cell in accordance with claim 10, said fuel cell further comprising:
a coolant flow path through which a coolant passes,
wherein the lower temperature area is provided in a region near to an inlet of the coolant into the unit cell, on the identical plane of the hydrogen permeable metal layer.

12. A fuel cell in accordance with claim 10, wherein the lower temperature area is provided in a region near to an inlet of a low temperature fluid having a temperature difference of at least a preset level from an average operating temperature of the fuel cell stack, on the identical plane of the hydrogen permeable metal layer.

13. A fuel cell in accordance with claim 1, wherein a number of said fuel cells as unit cells are
laminated to form a fuel cell stack, and
the hydrogen permeable metal layer included in each unit cell of the fuel cell stack has the higher temperature area and the lower temperature area according to a total temperature distribution of the whole fuel cell stack.

14. A fuel cell in accordance with claim 10, wherein the hydrogen permeable metal layer has the lower temperature area provided at a position corresponding to an outer periphery of the fuel cell stack.

* * * * *